United States Patent [19]
Niceley

[11] Patent Number: 5,307,836
[45] Date of Patent: May 3, 1994

[54] VEHICLE MULTI-COMPARTMENT AIR-BRAKE RESERVOIR WITH INTERNAL CHECK VALVE

[75] Inventor: Bob Niceley, Columbus, Ind.

[73] Assignee: Ventra Corporation, Columbus, Ind.

[21] Appl. No.: 951,465

[22] Filed: Sep. 25, 1992

[51] Int. Cl.⁵ .............................................. B60T 11/34
[52] U.S. Cl. ........................................ 137/576; 303/85
[58] Field of Search ..................... 303/80, 85; 137/576, 137/571

[56] References Cited

U.S. PATENT DOCUMENTS

| | | | |
|---|---|---|---|
| 28,722 | 6/1860 | Whitaker . | |
| 950,539 | 3/1910 | Mann | 303/85 |
| 1,832,391 | 11/1931 | Hildebrand | 303/85 |
| 2,319,844 | 5/1943 | Black | 137/571 |
| 3,223,118 | 12/1965 | Hutelmyer | 137/576 X |
| 3,648,730 | 3/1972 | Riester | 137/576 X |
| 3,941,149 | 3/1976 | Mittleman . | |
| 4,401,224 | 8/1983 | Alonso . | |
| 4,565,214 | 1/1986 | Parman . | |
| 4,714,297 | 12/1987 | Vaughn . | |
| 5,027,784 | 7/1991 | Osawa et al. . | |
| 5,067,449 | 11/1991 | Bonde . | |

*Primary Examiner*—Robert G. Nilson
*Attorney, Agent, or Firm*—Baker & Daniels

[57] ABSTRACT

A vehicle multi-compartment air-brake reservoir includes a housing and a rigid interior baffle disposed within the housing. The housing and the interior baffle define a supply and secondary chamber. An inlet and an outlet are formed in the supply chamber, and an outlet is formed in the secondary chamber. A one-way valve disposed in the interior baffle provides one-way fluid flow from the supply chamber to the secondary chamber.

9 Claims, 2 Drawing Sheets

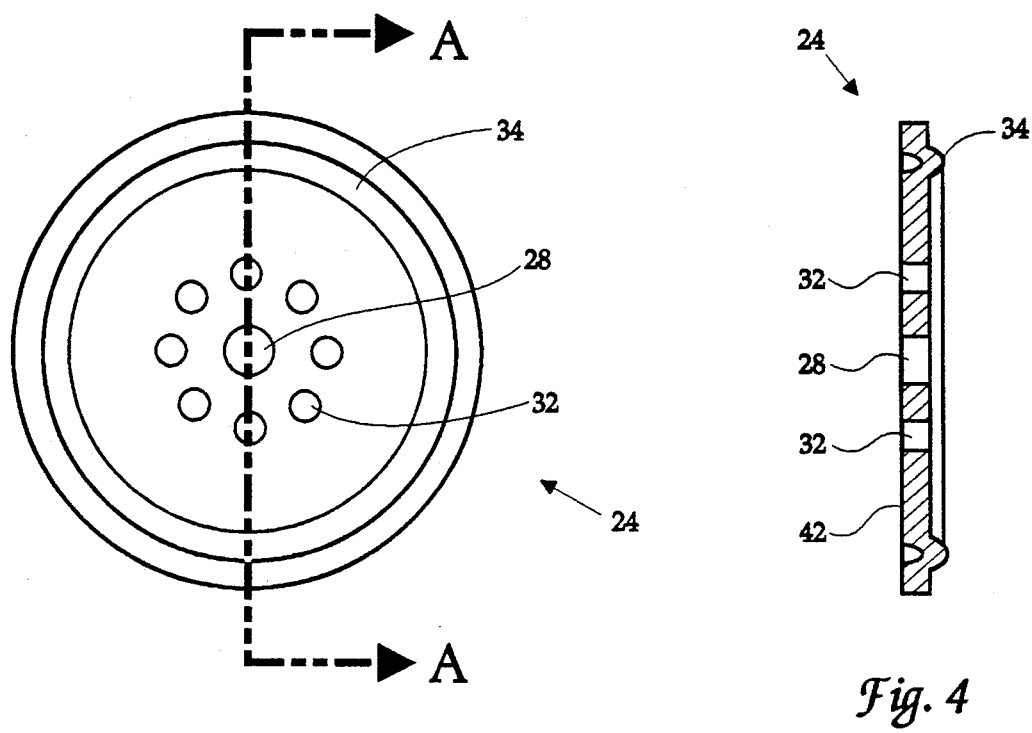
Fig. 3
Fig. 4
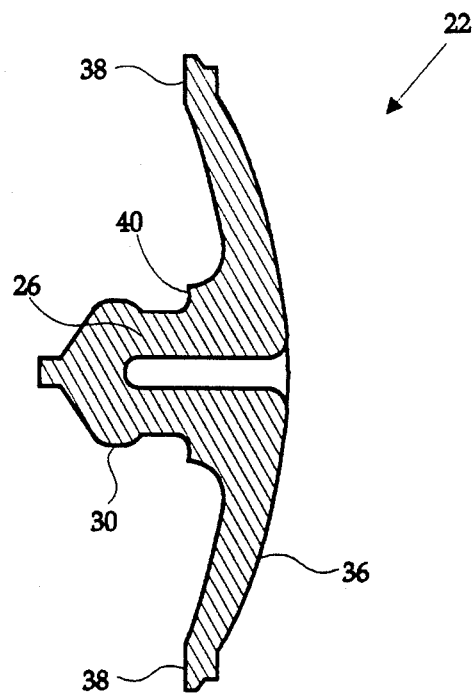
Fig. 5

VEHICLE MULTI-COMPARTMENT AIR-BRAKE RESERVOIR WITH INTERNAL CHECK VALVE

FIELD OF THE INVENTION

This invention relates to a vehicle air-brake systems, and, in particular, to a check valve in fluid communication with a supply and secondary chamber of a vehicle multi-compartment air-brake reservoir.

BACKGROUND OF THE INVENTION

Vehicle air-brakes systems require a supply of pressurized air. It is known in the art to provide a valve means in air-brake systems to control air flow direction and timing through the system, e.g., U.S. Pat. No. 4,714,297. For additional safety, a secondary pressurized air supply may be provided. Generally, a secondary pressurized air supply comprising a second air tank may provide a back-up air supply for the system. It is also known in the art to provide an exterior passageway extending between the supply tank and secondary air tank such that both the supply and secondary tanks may be pressurized through a single inlet. The inlet receiving pressurized air from an air pressure source is in fluid communication with the supply chamber and a check valve is usually disposed in the exterior passageway to provide one-way fluid flow from the supply chamber to the secondary chamber to thereby pressurize the secondary chamber. While such systems may provide the desired function of pressurizing the secondary chamber, the exterior passageway and/or check valve disposed therein are susceptible to physical damage. Such physical damage may in turn prevent the secondary chamber from being properly charged and thereby defeat the purpose of providing the desired back-up air supply to the air-brake system. Moreover, an exterior passageway requires manufacturing additional parts and thus adds to the cost of the system.

The use of check valves, as indicated above, in fluid flow applications is well known. For example, U.S. Pat. No. 28,722 discloses a specific type of check valve which may be used in a vessel having a flexible diaphragm separating a higher pressure region from a lower pressure region. Such a check valve, however, could not be used in a vessel having a rigid wall separating two chambers.

It is desirable to provide a system for simultaneously charging both a supply and a secondary chamber of a multi-compartment air-brake reservoir system which is relatively easy and inexpensive to manufacture and not susceptible to physical deformation from externally applied forces.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 illustrates in more detail the valve seat shown in FIGS. 1 and 2;

FIG. 4 is a sectional view of the valve seat taken at A—A in FIG. 3; and

FIG. 5 illustrates in more detail the rubber valve shown in FIGS. 1 and 2.

Figure 1:
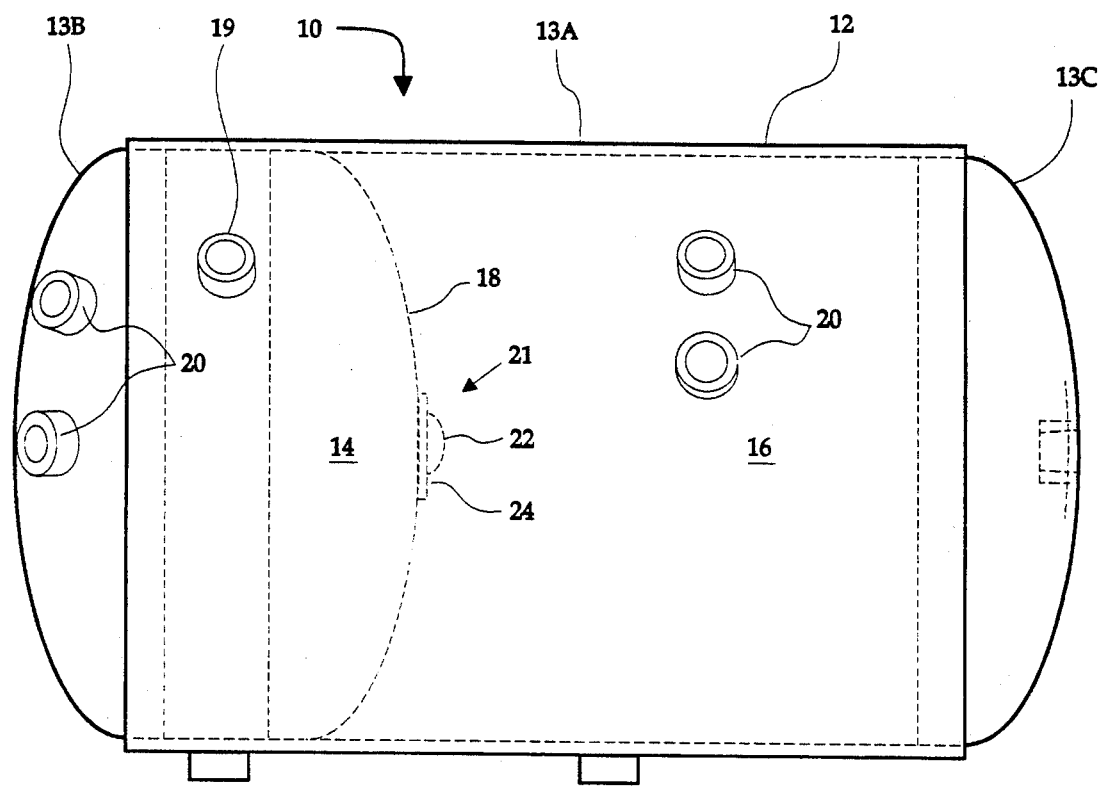
FIG. 1 is a side view of one embodiment of a multi-compartment vehicle air-brake reservoir having a supply chamber and secondary chamber separated by a rigid interior baffle with a one-way valve fixed thereto in accordance with the invention.

Corresponding reference characters indicate corresponding parts throughout the several views. The exemplification set out herein primarily illustrates one preferred embodiment of the invention, in one form, and such exemplification is not to be construed as limiting the scope of the invention in any manner.

SUMMARY OF THE INVENTION

The present invention is directed to a one-way valve disposed in an interior baffle of a multi-compartment vehicle air brake system. The one-way valve provides one-way fluid flow from the supply chamber to the secondary chamber and thereby pressurizes the secondary chamber.

Accordingly, the invention comprises, in one form thereof, a multi-compartment air-brake reservoir including a housing and a rigid interior baffle disposed within the housing. The housing and the rigid interior baffle define a supply and secondary chamber. An inlet and an outlet are formed in the supply chamber, and an outlet is formed in the secondary chamber. A one-way valve is imperviously fixed to the rigid interior baffle and covers the opening formed therein. The valve provides one-way fluid flow from the supply chamber to the secondary chamber.

In another form of the invention, the one-way valve is a valve seat having a central opening and at least one other opening, and a resilient valve having a stem. The valve seat is imperviously fixed to the rigid interior baffle and the stem of the resilient valve engages the central opening. The at least one other opening in the valve seat is adapted to allow one-way fluid flow from the supply chamber to the secondary chamber.

As advantage of the present invention is that the one-way valve is protected from physical damage from externally applied forces.

Another advantage is that restricted air flow from the supply to the secondary chamber caused by a damaged exterior air flow passageway is prevented.

Yet another advantage is that the one-way valve may be directly fixed to or disposed in the interior baffle, thus eliminating a component, i.e., the exterior passageway, and thereby saving material and manufacturing cost.

DETAILED DESCRIPTION

Referring now to the drawings, and particularly to FIG. 1, multi-compartment vehicle air-brake reservoir 10 includes a housing 12 having a supply chamber 14 and secondary chamber 16 separated by an interior baffle 18. A vehicle brake system inlet 19 is fixed to housing 12 and is in fluid communication with the supply chamber 14. A plurality of vehicle brake system outlets 20 allowing air flow from supply chamber 14 and secondary chamber 16 are fixed to housing 12 at desired locations.

Housing 12 includes a hollow cylindrical portion 13A with end portions 13B and 13C rigidly fixed thereto by, e.g., welding. Housing 12 and rigid interior baffle 18 are formed of material having a sufficient thickness and physical properties to withstand a maximum operating pressure of 150 pounds per square inch (1,035 KiloPascals). Housing 12 and interior baffle 18 are preferably formed to comply with standards set forth in F.M.V.S.S.-121, paragraph S5.1.2.2; and SAE-J10 October 90), which is incorporated herein by reference.

Figures 2, 6:
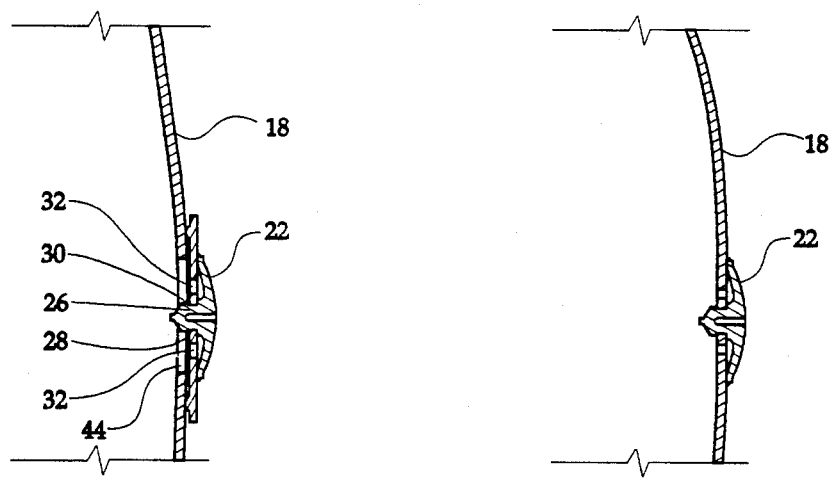
FIG. 2 is a partial side sectional view of FIG. 1 showing the rubber valve and valve seat disposed over an opening formed in the interior baffle.
FIG. 6 is a partial side sectional view similar to FIG. 2 of an alternate embodiment of the present invention wherein a valve seat is formed directly from the baffle.

Rigid interior baffle 18 is sealingly fixed to shell 12 and includes an opening 44 (FIG. 2) formed therein. In the embodiment shown, opening 44 is centrally located in rigid interior baffle, but could be located at a plurality of locations within rigid interior baffle in alternative embodiments (not shown). A one-way valve means 21 is fixed to rigid interior baffle 18 at a location in fluid communication with opening 44 and provides one-way fluid flow from the supply chamber 14 to secondary chamber 16. In an alternative embodiment (not shown), one-way valve 21 may be disposed in, e.g., press fit in, rigid interior baffle 18.

One-way valve 21 (FIG. 2) is a check valve including a rubber valve 22 adapted to engage and seal a valve seat 24. Valve seat 24 is formed with a central opening 28 (FIGS. 3 and 4) and a plurality of air flow openings 32. The plurality of air flow openings 32 are formed in valve seat 24 radially outward of central opening 28 and allow air flow from the supply chamber 14 to the secondary chamber 16. Valve seat 24 is formed of metal, e.g., stainless steel, and is rigidly fixed to rigid interior baffle 18 by, e.g., resistance welding. Valve seat 24 may be formed with an outwardly extending lip 34 (FIG. 4) providing a surface for attachment of lip 34 to interior baffle 18 by resistance welding. A smooth sealing surface 42 is formed with a sufficient diameter to allow sealing engagement with rubber valve 22.

Rubber valve 22 (FIGS. 2 and 5) is an umbrella valve in the embodiment shown. Umbrella valve 22 is formed with a centrally located stem 26 sized to slidably engage the central opening 28 formed in valve seat 24. Umbrella valve 22 includes a flexible annular umbrella portion 36 with a flat outer end 38 adapted to be disposed radially outward of the plurality of air flow openings 32 (FIG. 3) when stem 26 of umbrella valve 22 is disposed in central opening 28 of valve seat 24. A retaining flange 30 prevents rubber umbrella valve 22 from being disengaged from valve seat 24. A shoulder 40 provides a seat against valve seat 24 and maintains flexible annular umbrella portion 36 in a correct axial position relative to smooth sealing surface 42 of valve seat 24.

While the embodiment in FIGS. 1-5 illustrates a one-way valve including a valve seat and umbrella valve, other types of one-way valves suitable for use with a rigid interior baffle could also be used and are considered within the scope of this invention. For example, one-way valve 21 could be a flapper, ball or disk type check valve. Regardless of the type of check valve used, the check valve should have a maximum crack pressure of 3 pounds per square inch.

In operation, pressurized air from an air pressure source (not shown) flows through an inlet 19 and into supply chamber 14. Initially, the air pressure within supply chamber 14 and secondary chamber 16 may be at or near the ambient pressure and check valve 22 is in a relaxed position, i.e., flat outer end 38 of check valve 22 is not sealingly engaged against smooth sealing surface 42 of valve seat 24. As the pressure within supply chamber 14 increases, air is allowed to flow through the plurality of air flow openings 32 formed in valve seat 24 past the flexible annular umbrella portion 36 of check valve 22 and into the secondary chamber 16. The pressure is increased until the pressure within both the supply chamber 14 and secondary chamber 16 reaches a desired operating pressure, e.g., 120 pounds per square inch. Thereafter, when a supply of air is needed, e.g., such as when an operator applies the brakes of an air brake system, the pressurized air within supply chamber 14 will flow through one or more outlets 20 to the air brakes. As the pressure within supply chamber 14 decreases, the relatively higher pressure within secondary chamber 16 will cause flat outer end 38 of flexible annular umbrella portion 36 to seal against the smooth sealing surface 42 of valve seat 24, thereby preventing air flow back into supply chamber 14. In this manner, a secondary source of pressurized air within secondary chamber 16 is maintained and available to the air-brake system.

The a vehicle multi-compartment air-brake reservoir of the invention may be made by forming a sealable housing having an inner wall, an inlet and first and second outlets, then forming a rigid interior baffle having an opening formed therein. A one-way valve, such as an umbrella check valve, may be imperviously fixed to the interior baffle at a location wherein the one-way valve is in fluid communication with the opening formed in the interior baffle. The interior baffle may then be imperviously fixed to the inner wall of the housing at a location whereby the housing and the interior baffle define first and second chambers within the housing, and whereby the first chamber is in fluid communication the inlet and the first outlet, and the second chamber is in fluid communication with the second outlet. The one-way valve may be fixed to the interior baffle either before or after the interior baffle has been fixed to the housing interior.

While this invention has been described as having a preferred design, the present invention can be further modified within the spirit and scope of this disclosure. This application is therefore intended to cover any variations, uses or adaptations of the invention using its general principles. Further, this appliction is intended to cover such departures from the present disclosure as come within known or customary practice in the art to which this invention pertains and which fall within the limits of the appended claims. For example, it is contemplated that the valve seat could easily be formed directly from the baffle itself (See FIG. 6), instead of providing a separate valve seat and welding it to an aperture in the baffle. In addition, an umbrella valve attached to the valve seat using a bolt, or means other that a resilient valve stem fitted into an aperture in the valve seat may be employed, as such connection methods are within the valve art. Also, other one-way valves known in the art could be used in lieu of the umbrella valve.

What is claimed is:

1. A vehicle multi-compartment air-brake reservoir, comprising:
   a housing;
   a rigid interior baffle having an opening formed therein and disposed within the housing, the housing and the rigid interior baffle defining a supply chamber and a secondary chamber;

a vehicle brake system inlet and a vehicle brake system outlet formed in the supply chamber, and a vehicle brake system outlet formed in the secondary chamber; and a one-way valve means fixed to the interior baffle and covering the opening formed in the rigid interior baffle, the valve providing one-way fluid flow from the supply chamber to the secondary chamber.

2. The vehicle multi-compartment air-brake reservoir of claim 1 wherein the one-way valve means comprises a check valve operable to provide the one-way fluid flow when a predetermined pressure differential exists between the supply and secondary chambers.

3. The vehicle multi-compartment air-brake reservoir of claim 1 wherein the one-way valve means comprises a valve seat having at least one opening and a resilient valve having a stem, and the at least one opening adapted to allow the one-way fluid flow from the supply chamber to the secondary chamber.

4. The vehicle multi-compartment air-brake reservoir of claim 3 wherein the valve seat comprises metal.

5. The vehicle multi-compartment air-brake reservoir of claim 3 wherein the valve seat is fixed to the rigid interior baffle.

6. The vehicle multi-compartment air-brake reservoir of claim 3 wherein the resilient valve comprises an umbrella valve.

7. The vehicle multi-compartment air-brake reservoir of claim 1 wherein the one-way valve means comprises a valve seat having a central opening and at least one other opening, and a resilient valve having a stem, the valve seat fixed to the interior baffle, the stem of the resilient valve engaging the central opening, the at least one other opening adapted to allow the one-way fluid flow.

8. The vehicle multi-compartment air-brake reservoir of claim 7 wherein the at least one opening comprises a central opening and a plurality of openings radially disposed about a central opening, the resilient valve comprising an umbrella valve adapted to seal the plurality of openings and thereby provide the one-way fluid flow.

9. The vehicle multi-compartment air-brake reservoir of claim 3 wherein the valve seat comprises the rigid interior baffle.

* * * * *